April 7, 1942.   C. A. HASSLACHER ET AL   2,278,991
DEVICE FOR RAISING AND AERATING LIQUIDS
Filed July 15, 1939
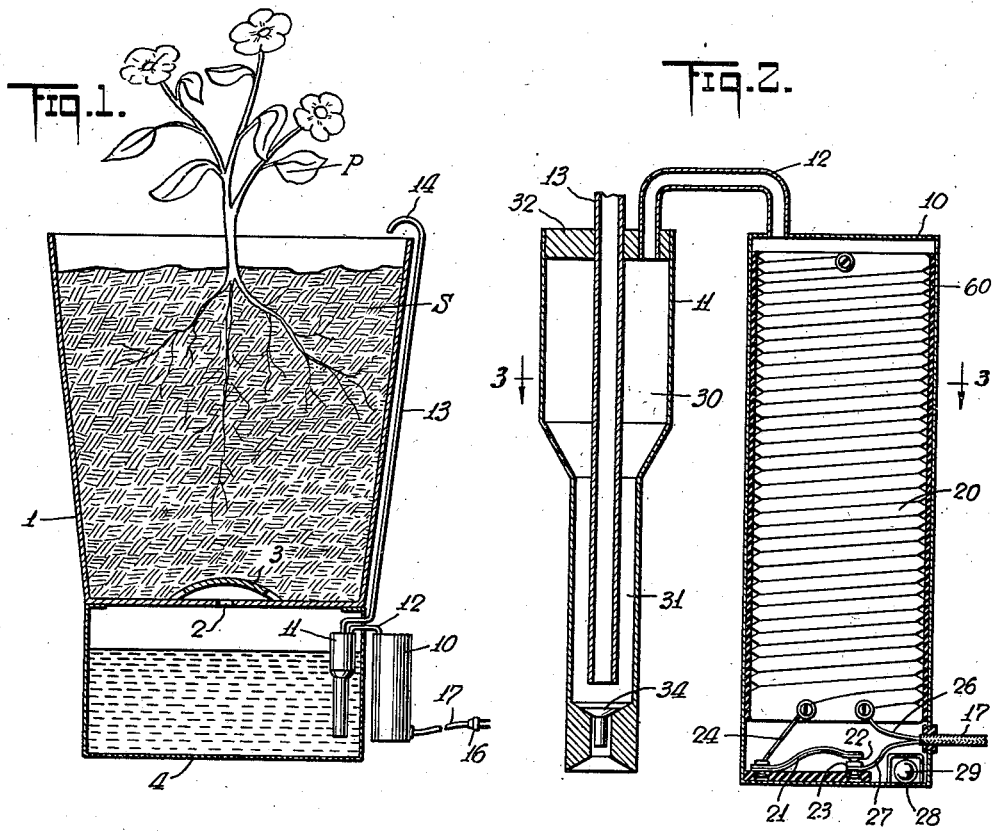
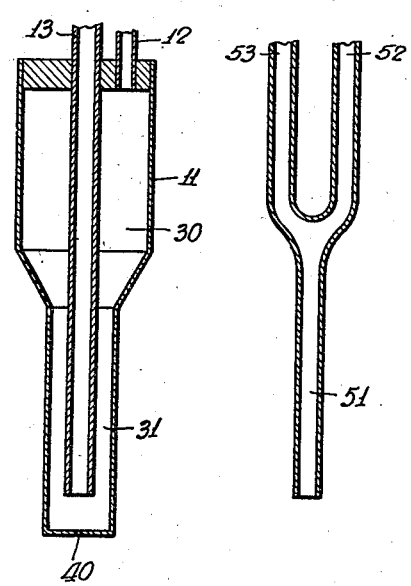
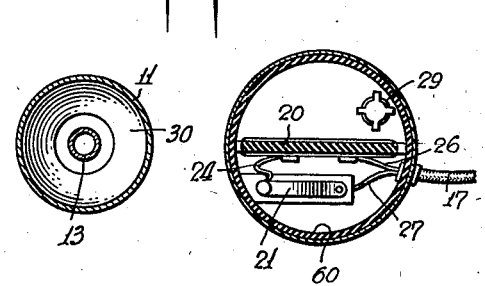
INVENTORS
Henry W. Rimbach
Carl A. Hasslacher
BY
John F. Ryan
ATTORNEY Patented Apr. 7, 1942

2,278,991

UNITED STATES PATENT OFFICE 2,278,991

DEVICE FOR RAISING AND AERATING LIQUIDS

Carl A. Hasslacher, Scarsdale, N. Y., and Henry W. Rimbach, Jersey City, N. J., assignors to Technico, Incorporated, New York, N. Y., a corporation of Delaware Application July 15, 1939, Serial No. 284,641

2 Claims. (Cl. 103—235)

This invention is a device for raising liquids and particularly for raising and aerating chemical solutions used in the soilless culture of plants.

In this process, the required chemicals are dissolved and this solution, known as a culture solution, is brought into contact with the roots of the plant. A common arrangement for small installations is to bury the roots of the plant in a pot containing sand or other suitable material, then supply the solution at the top of the pot from an elevated reservoir and permit it to filter down through the sand where it will come in contact with the roots. The liquid percolates down through the sand and comes out through a hole in the bottom of the pot to be collected in a suitable reservoir. After all the solution from the upper reservoir has filtered through and has been collected in the lower reservoir it is customary to daily aerate this solution by whipping it with an egg beater or by other suitable means and then to return the solution by hand to the upper reservoir to repeat the feeding cycle.

It is an object of this invention to produce a simple device which will automatically and continuously, perform these two functions, that is, lift the solution from the lower level to the upper and, at the same time, aerate it.

It is another object to produce a device of this character which is electrically operated, yet has no motor or mechanical pump such as a centrifugal or plunger pump, which might contaminate the solution.

It is still a further object to produce a device of this kind with a minimum of moving parts and mechanical combinations so as to insure long life, reliability, and economical production and operation.

In the drawing:

Fig. 1 is a sectional view through a flower pot and reservoir showing the pumping and aerating device connected thereto;

Fig. 2 is a sectional view of the device showing the air chamber and the liquid chamber;

Fig. 3 is a section through 3—3 of Fig. 2;

Fig. 4 is a sectional view showing a modified form of liquid chamber; and

Fig. 5 is a sectional view showing another modified form of liquid chamber.

Referring to the drawing, 1 is a pot for holding a plant and the sand in which the roots are buried. The plant is shown at P with its roots buried in the sand or other suitable material S contained in the pot 1. The bottom of the pot has a hole 2 in the center thereof protected by a perforated arcuate cover 3 so arranged that the sand will not fall through the hole.

Underneath the pot 1 and arranged so as to furnish a support therefor is a reservoir 4 adapted to receive the solution after it passes through the sand S and out through the hole 2 in the bottom of the pot 1. The pumping and aerating unit shown herein is designed to hang over the edge of the reservoir 4 with the air chamber 10 on the outside thereof and the liquid chamber 11 on the inside thereof. A pipe 12 connects the two chambers, and a discharge pipe 13 runs from the liquid chamber up along the outside of the pot 1 and is furnished with a gooseneck 14, which passes over the top edge of the pot 1 and permits discharge from this pipe into the top of the pot 1. An electric plug for connection to a source of power is shown at 16 with a wire 17 for conveying current to the air chamber 10.

Looking at Fig. 2, which is a sectional view of the air and liquid chamber, we see in the interior of the former a heating resistance coil 20 connected to the wire 17 through a bimetallic switch 21. This switch has contacts 22 and 23 thereon. One end of the resistance wire, shown at 24, is connected to the bimetallic element of the switch, and the other end of the resistance wire is connected to one of the leads of the inlet wire 17, as shown at 26. The other inlet wire, shown at 27, is connected to the terminal 23 of the bimetallic switch.

With this arrangement, it is obvious that we can produce an intermittent current flow through the resistance coil 20. When the bimetallic switch 21 is closed, current flows through coil 20 and heats it. This in turn heats the interior of the air receptacle or chamber 10, which causes the bimetallic switch to open, thus cutting off the supply of current and permitting the resistance coil 20 to cool off. When it is cooled, the bimetallic switch will close again, thus permitting current to flow again and repeating the cycle. The time of this cycle may be predetermined in the construction of the device and in practice, it has been found practical to complete the cycle in from one to four minutes. On the bottom of the air chamber 10 is an air inlet opening 28 controlled by a check valve 29. A very small aperture may be used instead of the check valve.

The liquid chamber is so arranged in relation to the reservoir 4 that its lower portion is below the level of the liquid therein, as shown in Fig. 1. The height of the level of the solution above the lower end of the discharge pipe 13 (Fig. 2) determines the qauntity of solution discharged in each cycle. This liquid chamber consists of an upper cylindrical portion 30 and a lower cylindrical portion 31 connected together by a tapering portion. The chamber is closed at the top by a suitable seal 32 through which passes the discharge pipe 13, the lower end of which is disposed only a short distance from the bottom of the lower portion 31. Pipe 12, connecting with the air chamber 10, passes through the seal 32 and terminates in the upper portion of the chamber 30. The bottom of the portion 31 is equipped with a check valve 34 which permits the culture solution to enter the bottom of the chamber 11, but does not permit it to pass out.

In operation, the device is positioned on the edge of the reservoir 4, as shown in Fig. 1, that is, with the liquid chamber partially immersed in the liquid. When it is desired to put the device in operation, it is connected to a convenient electrical outlet, and, inasmuch as the interior of the air chamber 10 is cool to start with, the bimetallic switch 21 will be closed, with the result that current will pass through the resistance coil 20, thus heating the interior of the chamber 10, which will cause the air therein to expand and move over through pipe 12 to the upper part of liquid chamber 11 creating a pressure on the surface of the solution therein and forcing this solution up through the discharge pipe 13. The excess air supplied by the air chamber 10 then blows out through the discharge pipe 13. If desired the end of the discharge pipe may be buried in the sand at any desired point so that after the solution has been discharged the air that follows will provide further aeration. As the air in chamber 10 becomes heated, the bimetallic switch 21 opens, thus breaking the circuit and permitting the resistance coil 20 to cool off. As the interior of the chamber 10 cools, the air therein contracts and air from the outside is drawn in through the opening 28 and check valve 29 to replace that which was forced over into the liquid chamber 11. Solution from the reservoir 4 passes up through the check valve 34 to restore the level in the chamber 11. In this manner, equilibrium is again restored and as the interior of chamber 10 cools off further, the bimetallic switch will again close, thus repeating the cycle. In operation, the device works to force "slugs" of solution up the discharge pipe 13. These "slugs" are well mixed with air so that the device serves the two purposes of raising the liquid and, at the same time, aerating it. The quantity of solution lifted in each cycle, can be adjusted by varying the height of the level of the solution above the lower end of the discharge pipe 13. The time of each cycle is determined by the construction of the bimetallic element, and by predetermining the heat retaining properties of the chamber 10. For example, this may be accomplished with an insulating lining 60. The time cycle of the bimetallic element may be fixed at the factory or an adjustable bimetallic element may be installed so that the time of the cycle of operation may be adjustable within certain limits. An external timing device may be used to control the current for one or a plurality of these devices if, for instance, it is desirable to more closely regulate and control the time cycle.

In Fig. 4 is shown another type of liquid chamber having a small aperture 40 in the bottom thereof instead of the check valve 34. Such an aperture will function as desired because the time for the solution in the reservoir 4 to fill or partly fill the liquid chamber 11 is relatively long, as compared to the time during which air pressure from the air chamber 10 acts on the solution in the interior of the liquid chamber 11. As the air is forced into the liquid chamber very quickly, the solution in the interior of liquid chamber 11 cannot all, or in fact very much of it, pass through the small aperture 40 during the expansion period and, consequently it is forced up through the discharge pipe 13. However, after all the solution has been displaced from the liquid chamber 11 the excess air not only passes up the discharge pipe 13, but also some passes through this aperture 40 thus further aerating the solution. After the bimetallic switch opens, and the interior of the air chamber 10 begins to cool off, there is a relatively long time period during which the solution in reservoir 4 can find its way through aperture 40 to refill the liquid chamber 11.

In Fig. 5 is shown a very simple form of liquid chamber which consists of an air inlet pipe 52, a discharge pipe 53 and a solution inlet pipe 51. When this liquid chamber is immersed in the solution so that the juncture of pipes 52 and 53 is below the solution level, and air is forced into pipe 52, the solution in pipe 53 is forced up and discharged into the top of the pot.

The device may be constructed so that one air chamber is connected to a plurality of liquid chambers. With such a construction, the air chamber is made large enough to supply air to all the liquid chambers it is desired to connect thereto. The liquid chambers are preferably all connected to a manifold communicating with the top of air chamber 10.

This device may be constructed in individual units to function with one reservoir and pot, or it may be constructed with a series of pumping units to function with a number of reservoirs and pots but all supplied from a single air expansion chamber.

Furthermore, a manifold may be attached to the end of each discharge pipe so that the solution may be conveyed to several points either in the same pot or different pots. This device has found application in the soilless culture of plants but may also be used in watering a plant rooted in soil.

Other modes of applying the principles of our invention may be employed instead of those explained, change being made as regards the method herein disclosed, provided the steps or compounds stated by any of the following claims or the equivalent of such stated steps or compounds be employed.

Having thus described our invention, what we claim as new and desire to secure by Letters Patent is:

1. In a device for raising and aerating liquids used in the cultivation of plants, an air chamber, an electric heating element in said chamber, a switch for periodically supplying electric current to said element and cutting it off therefrom, an aperture for permitting the inflow of air to said chamber adapted to substantially prevent the rapid outflow of air therefrom, a liquid chamber, a passageway connecting said chambers, a discharge pipe from said liquid chamber, and an aperture for permitting the inflow of liquid to said liquid chamber adapted to substantially prevent the rapid outflow of liquid therethrough from said chamber.

2. In a device for raising and aerating liquids used in the cultivation of plants, an air chamber, an electric heating element in said air chamber, an automatic switch for supplying current to said element and cutting it off at definite predetermined intervals, a check valve to permit the admission of air to said air chamber and prevent the escape therefrom through the same opening, a liquid chamber comprising three connected passageways, means for connecting one of said passageways to said air chamber, means for connecting another one of said passageways to a discharge pipe, and a constricted opening never closed in the bottom of said third passageway adapted to admit the solution to be raised into said liquid chamber.

CARL A. HASSLACHER.
HENRY W. RIMBACH.